V. FEESER.
SOLDER CORED WIRE.
APPLICATION FILED JULY 7, 1914.

1,148,223.
Patented July 27, 1915.

Witnesses:

Inventor:
Viktor Feeser

UNITED STATES PATENT OFFICE.

VIKTOR FEESER, OF PFORZHEIM, GERMANY, ASSIGNOR TO THE FIRM OF G. RAU, DOUBLEFABRIK, OF PFORZHEIM, GERMANY.

SOLDER-CORED WIRE.

1,148,223. Specification of Letters Patent. Patented July 27, 1915.

Application filed July 7, 1914. Serial No. 849,615.

*To all whom it may concern:*

Be it known that I, VIKTOR FEESER, a subject of the German Emperor, and resident of Pforzheim, Germany, have invented certain new and useful Improvements in Solder-Cored Wires, of which the following is a specification.

The hitherto known solder-cored wires contain the solder either as a cylindrical pipe, which separates the inner core from the outer case, or as thin wires, which are introduced into parallel channels in the work-piece and then rolled or drawn out with the work-piece to form fine wire. In any case, apart from other drawbacks, the disadvantage exists that it is not possible to reduce the contents of solder in the finished wire below a certain limit, namely 4%, because the solder inserted cannot be employed below a certain thickness. Consequently, often much more solder is present at the cut ends of the wire than is necessary for the firmness of the soldering. For, the thinner the solder layer connecting the two wire ends, the more resisting is the same especially to the torsion strain occurring to chain links.

The present invention relates to an improved solder-cored wire, which avoids these drawbacks and which is represented on the accompanying drawing, in which—

Figure 1:
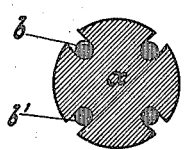
Figure 2:
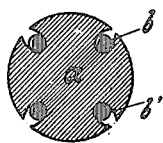
Figure 3:
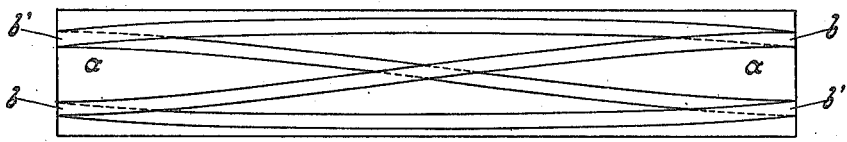
Figure 4:
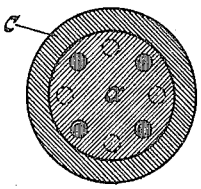

Figures 1 and 2 are cross-sections through the inner core before and after the edges of the grooves for the reception of the solder threads are bent inward; Fig. 3 is a side view of said inner core; Fig. 4 is a sectional edge view of one end, and Fig. 5 a similar view of the other end, of the wire.

According to the present invention, the core $a$ of the cylindrical metal piece, out of which the wire is drawn, is on its outside provided with several, for instance four, grooves, in which the solder threads $b$, $b'$, which are drawn out to any fineness, are inserted (Fig. 1). The grooves may be produced by drawing the core through a correspondingly shaped draw-plate. Thereupon, the core $a$ with the solder threads is drawn through a second draw-plate, which bends the outer edges of the grooves somewhat inward, so that now the solder threads are fixed therein and cannot escape (Fig. 2.) Thereupon, the core with the fixed solder threads, which so far run parallel to the longitudinal axis of the core, is helically twisted around the latter, as shown in Fig. 3 in a side view of the wire work-piece, which for clearness of showing is supposed to be transparent. Such twisting of the core makes the previous fixing of the solder threads absolutely necessary, as the same would otherwise be displaced from their position in the grooves. The core with the solder threads thus treated is finally introduced into the case $c$ (Figs. 4 and 5) in a way known in the art and the wire work-piece is stretched out to form the finished wire.

Figure 5:
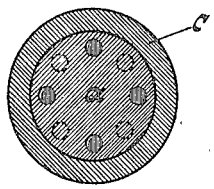

According to the thickness of the wire work-piece and of the finished wire, as well as to the number of the solder threads and the required length of the single wire pieces, the core with the solder threads in its grooves must be more or less twisted in order that the finished single wire pieces, after being bent together for the formation of a ring or link, show at their cut surfaces to be joined such a position of the solder ends that the latter do not touch each other but that each solder end at one wire end lies symmetrically between two solder ends at the other wire end (see Figs. 4 and 5). Consequently, the actual expansion of the solder, which eventually acts to drive the joint asunder, is considerably decreased and the escaping solder comes in touch with the main metal at double as many points as solder threads are present. Thereby, a uniform distribution of the solder and a thinner solder joint is obtained.

By the outer case remaining untwisted, as above described, all difficulties for the further treatment are avoided and every security is afforded that the wire, after being finally drawn and cut into pieces, shows the required twist of the solder threads.

I claim:

A solder-cored wire, comprising a plurality of solder threads, a core having longitudinal grooves on its outside for the reception of said solder threads and bent inward edges on said grooves to fix the solder threads therein, said core with solder
5 threads being helically twisted around the longitudinal axis of the core, and a straight case to inclose said twisted core and solder threads, for the purpose set forth.

VIKTOR FEESER.

Witnesses:
 KARL SCHMIDT,
 HANS LANGE.